July 16, 1929.  W. T. FITZ GERALD  1,721,382
CIGAR MAKING MACHINE AND PRODUCT THEREOF
Filed Sept. 14, 1925    3 Sheets-Sheet 1

Inventor:
William T. FitzGerald,
by Walter E Lombard,
Atty.

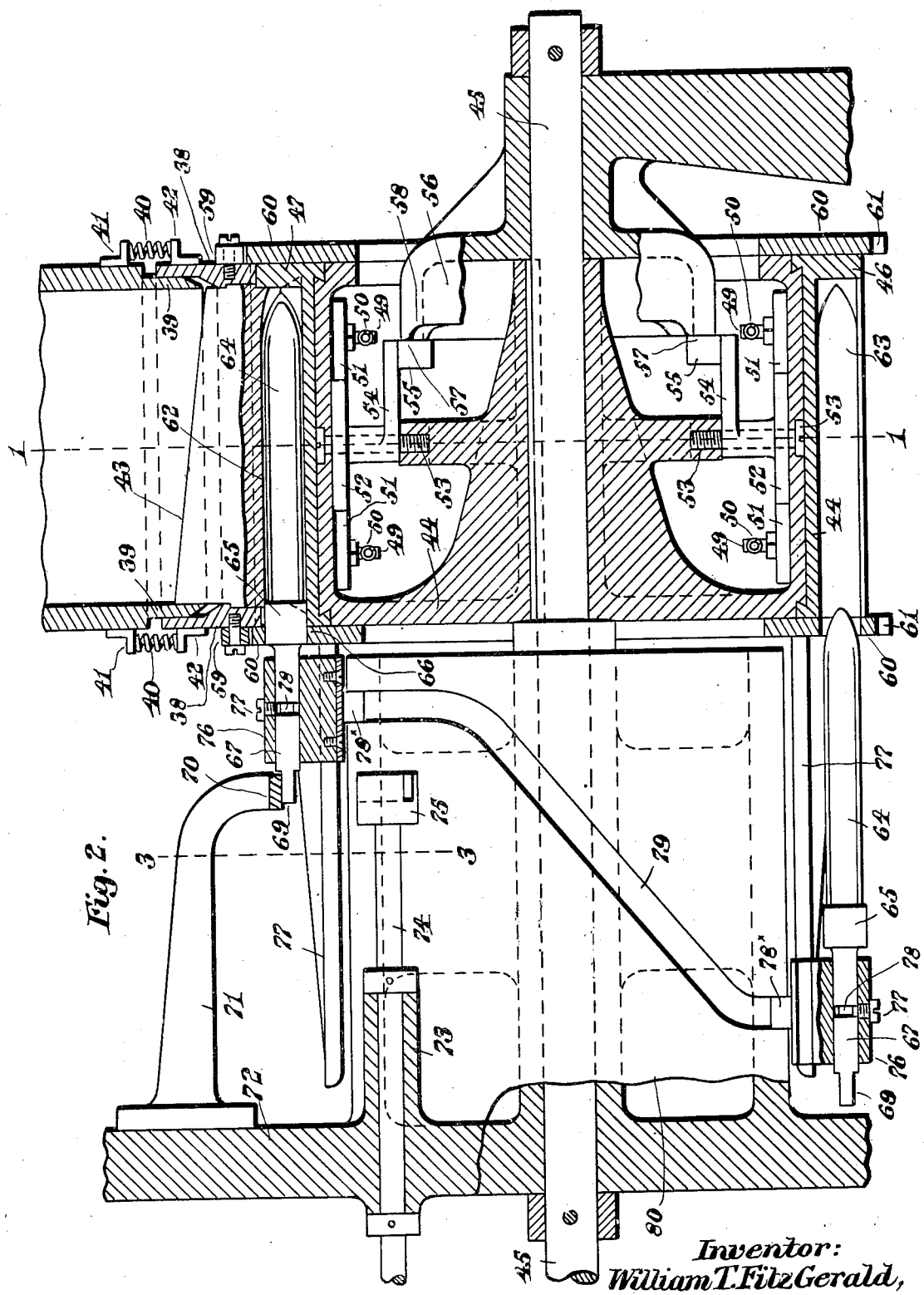

July 16, 1929.  W. T. FITZ GERALD  1,721,382
CIGAR MAKING MACHINE AND PRODUCT THEREOF
Filed Sept. 14, 1925   3 Sheets-Sheet 3
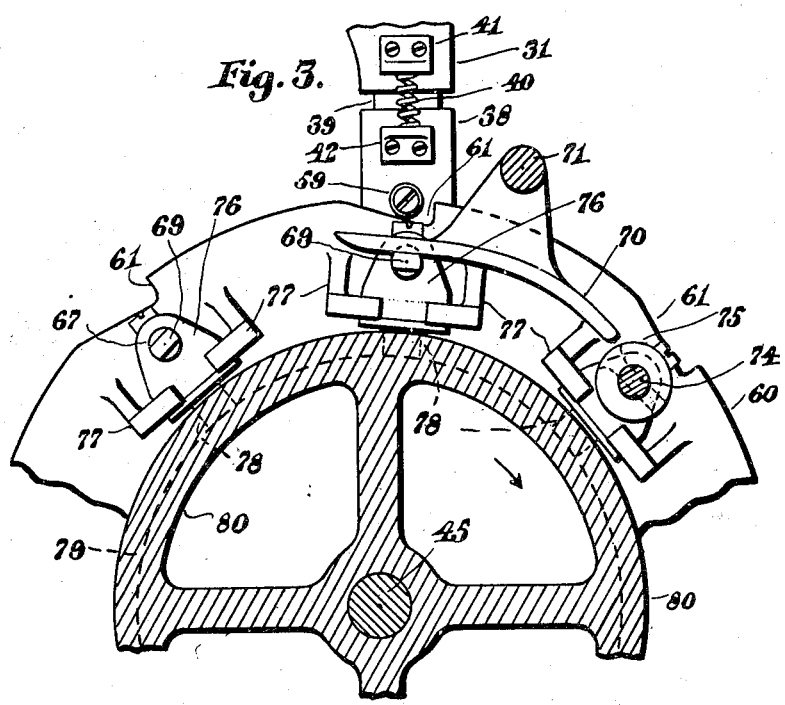
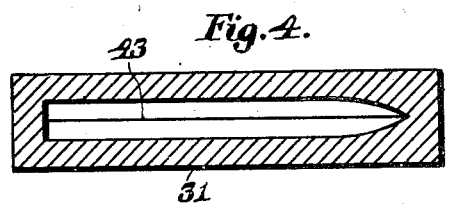
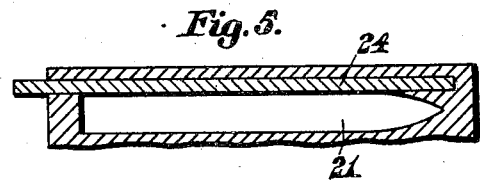
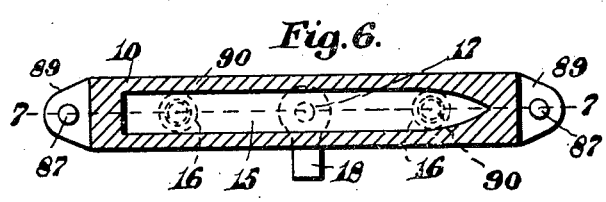
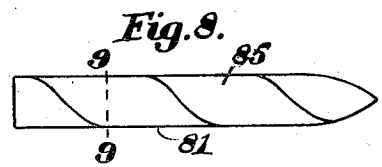
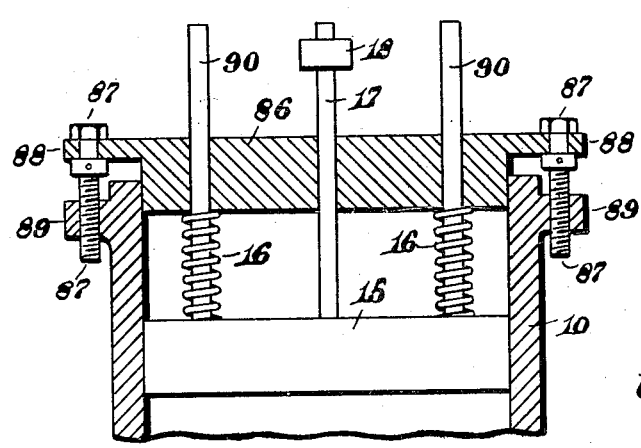
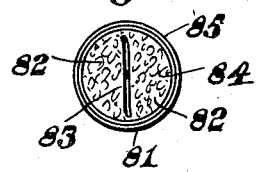
Inventor:
William T. Fitz Gerald,
by Walter E. Lombard,
Atty.

Patented July 16, 1929.

1,721,382

UNITED STATES PATENT OFFICE.

WILLIAM T. FITZ GERALD, OF WASHINGTON, DISTRICT OF COLUMBIA, ASSIGNOR TO INTERNATIONAL CIGAR MACHINERY COMPANY, A CORPORATION OF NEW JERSEY.

CIGAR-MAKING MACHINE AND PRODUCT THEREOF.

Application filed September 14, 1925. Serial No. 56,187.

This invention relates to cigar making machines and product thereof, and has for its object the production of a machine of this character which will be simple in construction, easy to operate, and will eliminate a great part of the manual labor now employed in the manufacture of handmade cigars, said machine being adapted to make a cigar of novel construction.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 2 represents a transverse longitudinal section of the same on line 2, 2 on Fig. 1.

Figure 3 represents a vertical section on line 3, 3 on Fig. 2.

Figure 4 represents a horizontal section of the tobacco magazine, on line 4, 4 on Fig. 1.

Figure 5 represents a section through the delivery passage to said magazine on line 5, 5 on Fig. 1.

Figure 6 represents a vertical section of the tobacco chute, on line 6, 6 on Fig. 1.

Figure 7 represents a horizontal section through the outer end of the tobacco chute, on line 7, 7 on Fig. 1.

Figure 8 represents an elevation of a cigar as made in said machine, and

Figure 9 represents a transverse section of same on line 9, 9 on Fig. 8.

Similar characters indicate like parts throughout the several figures of the drawings.

Figure 1:
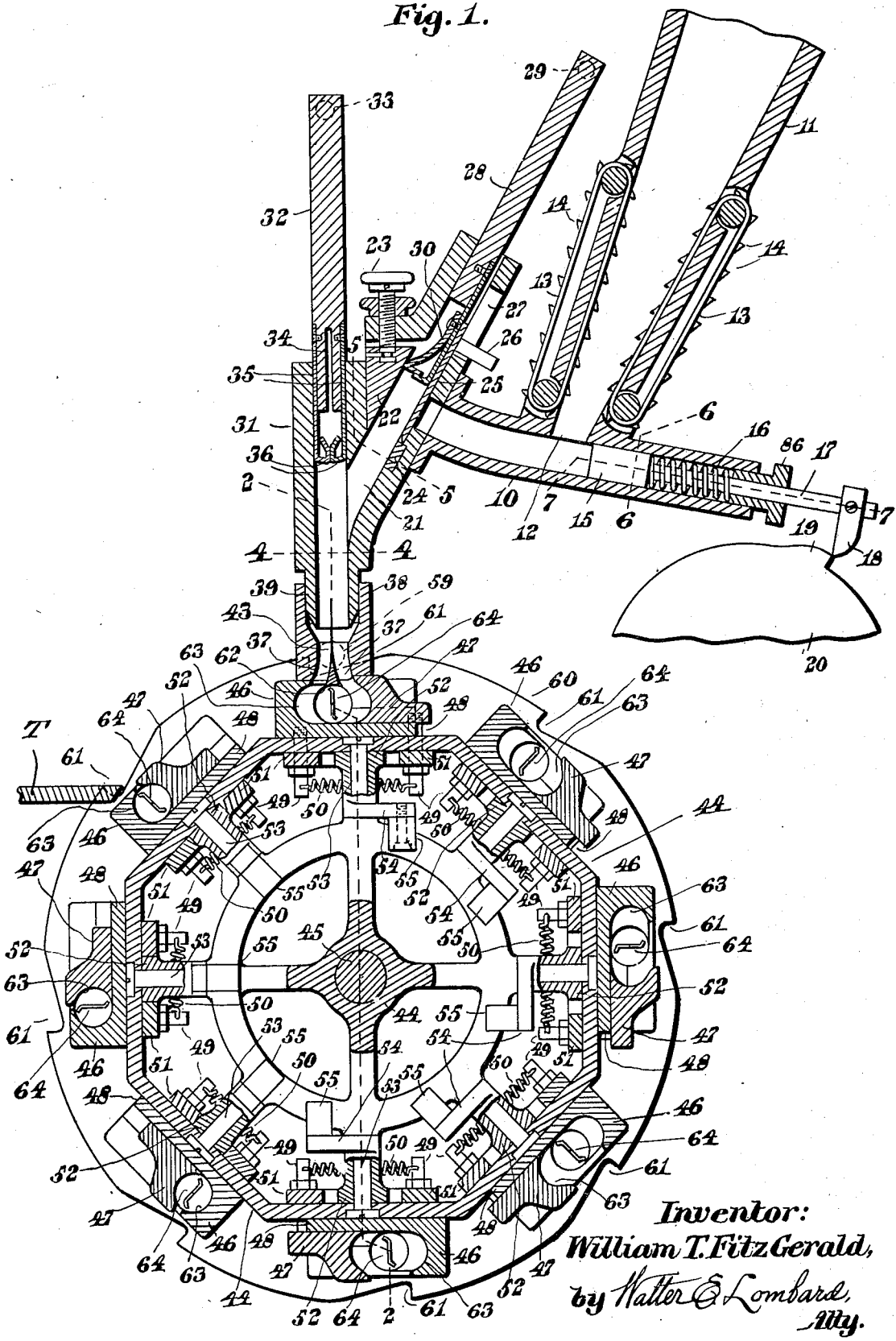
Figure 1 represents a vertical section of so much of a cigar making machine as is necessary to illustrate the various mechanisms and devices which cooperate to manufacture a cigar, on line 1, 1 on Fig. 2.

In the drawings, 10 is a chute, cigar-shaped in cross section (as shown in Fig. 6) above which is a hopper 11 adapted to contain the tobacco to be used as a filler for the cigars, such filler tobacco being selected or cut to length and the hopper being of a width substantially the length of the cigars to be produced.

The lower end of the hopper 11 communicates by a discharge opening 12 with the chute 10 and said hopper has oppositely disposed endless belts 13 provided with projections 14 which extend into the hopper and feed the tobacco from said hopper into the chute 10.

These belts may be driven by any suitable mechanism which is not illustrated in the drawings as it forms no part of the present invention and this is also true of other mechanisms which may be employed to actuate the various plungers, knives and other instrumentalities to be hereinafter described.

In the chute 10 is a plunger 15, also cigar-shaped in cross section, which is slidable in said chute 10 and is forced against the tobacco delivered into the chute through the discharge outlet 12 of the hopper 11.

The plunger 15 is forced in one direction by the springs 16 interposed between said plunger 15 and the outer end of the chute 10.

The plunger 15 has a rod 17 extending therefrom through the outer end of the chute 10 and the projecting end of said rod 17 is provided with a finger 18 adapted to be engaged at the proper time by a cam projection 19 on a rotatable disk 20 to compress the springs 16 and move the plunger 15 from beneath the discharge outlet 12, thereby permitting the admission of the filler tobacco into said chute 10 from the hopper 11.

When the finger 18 is released the expansion of the springs 16 will force the plunger 15 forward beneath the opening 12 and close the same preventing further admission of tobacco to the chute 10 until the operation is repeated.

When the plunger 15 is thus advanced it forces forward the tobacco in the chute 10 and causes a portion thereof to be projected across a delivery passage 21.

Opposite the discharge end of the chute is an adjustable block 22 which limits the amount of tobacco which may be forced into the delivery passage 21.

This block 22 may be adjusted by the member 23 to regulate the quantity of tobacco to be admitted to the delivery passage 21, which passage is also cigar-shaped in cross section as shown in Fig. 5.

Set into the opposite wall of the delivery passage is a chopping block 24 with which coacts a reciprocating knife 25 movable across the mouth of the chute 10 and adapted to sever a predetermined quantity of tobacco from the tobacco remaining in said chute.

The knife 25 has a stud 26 projecting therefrom through a slot 27 in the wall of the delivery passage 21 and to which any suitable driving mechanism may be connected to impart a limited movement to said knife across the mouth of the chute 10 and against the chopping block 24.

Within the passage 21 is a plunger 28 which is provided with a stud 29 adapted to be connected with any suitable actuating mechanism for reciprocating said plunger.

This plunger 29 is provided at its lower end with an extension 30 adapted to yield to accommodate itself to the varying width of the passage 21 when the block 22 projects therein to a greater or lesser extent.

The lower end of the delivery passage 21 communicates with the tobacco magazine 31 and the operations of the knife 25 and plunger 29 are so timed that the knife 25 first severs a predetermined quantity of tobacco and then the plunger 29 moves downwardly forcing the severed tobacco ahead of it and finally deposits it in the magazine 31.

This magazine 31 is also cigar-shaped and of the same area as the chute 10 and passage 21, as shown in Fig. 4.

The magazine 31 has disposed therein a plunger 32 provided with a stud 33 at its upper end adapted to be connected to any suitable mechanism which will impart a reciprocatory movement to said plunger after the plunger 28 has deposited the severed tobacco in the magazine and itself withdrawn from the path of the plunger 32.

The plunger 32 is provided with a central slot 34 in its lower end extending lengthwise thereof and on the opposite faces of said plunger are secured the spring plates 35 having inturned portions 36 normally abutting but capable of separation when in the downward movement of the plunger the portions 36 are forced through the passages 37 at the lower end 38 of the magazine.

This lower end 38 of the magazine is fitted over the reduced end 39 of the body portion of the magazine and is forced downwardly by the helical springs 40 interposed between the brackets 41 and 42 at the opposite ends of the magazine 31, 38.

A partition 43 in the form of a knife with its sharp edge uppermost is disposed in the end 38 and forms the passages 37.

When the plunger 32 descends it will force the severed tobacco against the sharp edge of the knife 43 dividing said tobacco into two equal parts, each of which will be forced through one of the passages 37. In the downward movement of the plunger 32, the knife 43 enters the slot 34.

Below the magazine 31 is a rotatable drum 44 mounted upon a revoluble shaft 45 and said drum is preferably octagonal, each flat face of which has slidably mounted thereon a divided cigar mold 46, 47.

The part 46 of the mold has an extension 48 on which the part 47 rests and both parts 46, 47 have pins 49 extending from the bottoms thereof through slots in the wall of the drum.

Springs 50 are connected to and interposed between said pins 49, these springs tending to retain the two parts 46, 47 of the mold in closed position.

There are two pins 49 on each part 46, 47 and within the wall of the drum 44 the pins 49 of each part 46, 47 have mounted thereon a plate 51.

It is obvious, therefore, that there will be two parallel plates 51 for each mold, one plate for each part 46, 47 thereof.

Between these plates 51 is interposed a cam member 52 which is adapted to be rotated to force apart the plates 51 and thereby open the mold.

The cam 52 is mounted to oscillate upon a short shaft or stud 53 and the hub of said cam 52 has a lever 54 extending therefrom, the outer end of which supports a roller 55 always in contact with a fixed cam ring 56.

When the mold 46, 47 is in bunch or filler receiving position the roller 55 is in contact with the face 57 of the cam ring 56 with the cam 52 at sufficient angle to the parallel edges of the plates 51, to retain in open position the parts 46, 47 of the mold.

As soon as the drum is rotated to move the mold from bunch or filler receiving position to wrapper receiving position the roller 55 comes into contact with the throw 58 of the cam ring 56 and the cam 52 is moved into position parallel with the plates 51 thus permitting the springs 50 to act and move the parts 46, 47 toward each other to close the mold.

In order to permit the rotation of the drum 44 and the movement of the mold 46, 47 towards the wrapper receiving position, the lower end 38 of the magazine 31 must be moved upwardly out of the path of the mold.

To accomplish this the opposite ends of the lower end 38 of the magazine is provided with projecting rollers 59 which rest upon the edge of cam plates 60 on the opposite ends of the drum 44, these plates 60 having cam throws 61 which when the drum commences to rotate will act upon the rollers 59 and cause the end piece 38 to be lifted against the tension of springs 40 out of the path of the mold.

By the time the mold reaches the wrapper receiving position the mold 46, 47 will be closed and will remain closed until the drum 44 has passed the next stopping point.

It must be understood that the rotation of the drum is accomplished step by step and when said drum has been rotated through one eighth of a cycle, it will come to a standstill, ceasing to rotate long enough to permit the insertion of another bunch of filler tobacco into the open mold in the bunch or filler receiving position and to permit the insertion of the binder and wrapper into the particular mold which is in the wrapper receiving position.

The lower end of the knife 43 is widened as shown in the drawings with its lower edge curved as at 62.

Each part 46, 47 of the mold has a concavity 63 therein in the shape of one half of a cigar, although the concavity 63 in the part 47 is slightly enlarged at its upper end thereby forming a space into which the binder and wrapper may be fed when the mold is closed.

Moreover, the pointed end of the concavity 63 in the part 47 is still further enlarged to permit the smaller end of the wrapper to be more readily wrapped smoothly about the pointed end of the filler tobacco.

The rear end of this wrapper is moistened with the usual adhesive, so that the wrapper will adhere to the tip of the cigar.

Centrally disposed in each mold 46, 47 at a point below the partition between the outlet passages 37 is a flat sided member 64 having its opposite edges curved slightly in opposite directions.

When the mold 46, 47 is in bunch or filler receiving position the flat sided member 64 is disposed vertically with its upper edge positioned within the concaved lower edge 62 of the knife 43. Consequently, when the tobacco filler is in bunch or filler receiving position and the bunch of filler tobacco is forced into the mold an equal amount of filler tobacco will be disposed on each side of the member 64.

As each mold 46, 47 moves from the bunch or filler receiving position to the wrapper receiving position, it will be closed, thereby compressing the tobacco to some extent and forcing it into contact with the sides of the flat sided member 64.

This member 64 is designed to turn the filler tobacco within the concavities 63 of the mold 46, 47 and when this tobacco is so turned in contact with the smooth surface of said concavities it will smooth the surface of the filler and cause it to assume the shape of a finished cigar.

The outer end of the flat sided turning member 64 has a cylindrical portion 65 which normally is disposed in an opening 66 in the cam plate 60 and from this cylindrical portion 65 projects an extension 67 cylindrical in cross section and provided with a flat sided end portion 69.

The flat sided end portion 69 contacts with a fixed guide rail 70 thereby preventing the rotation of the turner 64 until said portion 69 passes the end of the guide rail 70 in the rotation of the drum 44.

The guide rail 70 is supported by a bracket 71 extending from a fixed member 72 provided with a bearing 73 in which rotates a shaft 74 having on one end thereof a bifurcated head 75.

This shaft 74 is adapted to be rotated when each mold 46, 47 is in a wrapper receiving position at which time the flat sided end portion 69 will have entered the bifurcated head 75 and alined itself therewith.

The cylindrical portion 67 is disposed within a bearing in the block 76 which is provided with a pin 77 extending into an annular groove 78 in said cylindrical portion 68 thereby preventing end movement of the turner 64 relatively to said block.

While the turner 64 is being rotated within the concavities 63 of the mold the operator successively inserts first a binder and then a wrapper into the upper part of the concavity 63 in the part 47 of the mold. The binder and wrapper may be guided into the slot of the mold upon a table or shelf T, so that the binders and wrappers may be conveniently placed on said table and pushed in the slot of the mold which registers with the table.

The strip of binder will grip upon the filler and as the latter is rotated within the mold 46, 47 said binder will be wrapped about the filler.

When this has been accomplished the wrapper is inserted in the same manner and wrapped about the binder and as said wrapper contacts with the polished surface of the concavities 63 it will be ironed out and freed from all creases, giving the completed cigar a very finished appearance. The block 76 is slidably mounted upon a bar 77 extending laterally from one side of the drum 44.

This block 76 has a roller 78$^x$ extending from the bottom thereof, said roller being disposed in a cam path 79 in a nonrevoluble cylinder 80.

When the wrapper has been applied the rotation of the turner will be completed and the drum 44 will be rotated again to move the mold into its next position and during this movement the roller 78$^x$ will move along the cam path 79 causing the block 76 to be moved towards the outer end of the bar 77.

In this manner the turning member 64 will be withdrawn from the finished cigar thus permitting the cigar to be discharged from the mold when the latter is again opened by the further rotation of the drum 44.

As thus far described, the movement and operation of a single mold and its accessories has been described, but it is selfevident that each flat face of the octagonal drum 44 is provided with a similar mold and accessories.

It is also obvious that while one mold is in the bunch or filler receiving position and the filler tobacco is being introduced therein another mold is in the wrapper receiving position and the operator is introducing a wrapper thereto, while a third mold is in position for the turning member 64 to be withdrawn from the completed cigar and a fourth mold is in open position for the discharge of the completed cigar therefrom.

In other words, during each complete rotation of the drum 44, eight cigars are manufactured.

The comlpeted cigar 81 will have two sections of filler tobacco 82 separated from end to end by a slit 83 from which the turner 44 has been withdrawn.

The two sections of filler tobacco 82 will have a binder 84 surrounding the same, retaining said sections 82 in contact but this binder will not be wound so tight about the sections 82 as to prevent a clear vent through the slit 83.

Surrounding the binder 84 will be wound the usual wrapper 85.

A cigar thus made will be a superior article with the filler tobacco evenly and equally disposed within the binder 84 so that it will smoke readily from end to end.

The outer end 86 of the chute 10 is preferably a separate plate adjustable relatively to the body portion of the chute, this adjustment being made by the members 87 revolubly mounted in the ears 88 on the end plate 86 and threaded to the ears 89 on the chute 10.

The springs 16 surround rods 90 extending from the plunger 15 through the end plate 86. By adjusting the position of the end plate 86 the tension of the springs 16 may be varied as desired.

Usually in machine manufactured cigars there is a great loss due to the fact that the machines will often apply the binder and wrapper so tightly thereon that these cigars will not draw freely.

These objections are entirely overcome in the cigars manufactured in the machine herein described.

It is obvious that in the manufacture of cigars in this machine there will be no waste of material as in the feeding of the filler tobacco only the required amount of filler tobacco is fed which is necessary for the cigar being manufactured.

It is self-evident that any size and shape of cigar may be made by simply changing the shape and size of the concavities in the two parts of the mold and providing a suitably shaped turner therefor.

If desired a simple machine may be constructed with only a single mold which when open will communicate with the feeding mechanism and which when closed may be moved into position to receive the binder and wrapper while the turner in the mold is rotating.

The present invention is an improvement upon the invention set forth in another application, Ser. No. 743,625, filed by William T. Fitz Gerald and Monroe E. Miller, October 14, 1924, for cigar making machines.

It is believed that the operation and many advantages of the invention will be understood without further description.

Having thus described my invention, I claim:

1. In a cigar making machine, a divided cigar mold of which the parts are movable toward and from each other; a tobacco magazine above said mold; a knife in said magazine forming two passages communicating with said mold; and a bifurcated plunger adapted to reciprocate and force the tobacco through both passages into said mold.

2. In a cigar making machine, a divided cigar mold of which the parts are movable toward and from each other; a tobacco magazine communicating with said mold; a knife in said magazine forming two passages communicating with said mold; means for forcing the tobacco through both passages into said mold; and means for rotating the tobacco delivered to said mold.

3. In a cigar making machine, a longitudinally divided cigar mold of which the parts are movable toward and from each other; a tobacco magazine communicating with said mold; a knife in said magazine forming two passages each communicating with said mold; means for forcing the tobacco through both passages into said mold; and a rotatable member within said mold having its opposite edges curved in opposite directions.

4. In a cigar making machine, a divided cigar mold of which the parts are movable toward and from each other; a tobacco magazine above said mold; a partition in the lower end of said magazine forming two passages therein; means for forcing the tobacco in said magazine through said passages into said mold; and a rotatable member in said mold adapted to rotate the tobacco within said mold.

5. In a cigar making machine, a divided cigar mold of which the parts are movable toward and from each other; a tobacco magazine communicating with said mold; a knife in said magazine forming two passages communicating with said mold; means for forcing the tobacco through both passages into said mold; means within said mold for rotating the tobacco therein; and means for withdrawing said rotating means from the completed cigar.

6. In a cigar making machine, a divided cigar mold of which the parts are movable towards and from each other; a tobacco magazine above said mold having two outlet passages communicating with said mold when open; a rotary member normally disposed within said mold beneath the partition between said passages; means for rotating said rotary member; and means for forcing tobacco from said magazine into said mold on opposite sides of said rotary member.

7. In a cigar making machine, a divided cigar mold of which the parts are movable towards and from each other; a tobacco magazine having two outlet passages communicating with said mold when the latter is open; a rotary member normally disposed within said mold beneath the partition between said passages; means for rotating said rotary member; means for forcing tobacco from said magazine into said mold on opposite sides of said rotary member; and means for withdrawing said member endwise from said mold.

8. In a cigar making machine, a longitudinally divided cigar mold of which the parts are movable toward and from each other; a tobacco magazine cooperating with said mold and having a partition in its lower end forming two elongated passages each communicating with said mold; a rotatable member in said mold normally disposed in vertical position beneath said partition; and means for forcing a predetermined quantity of tobacco through said passages into said mold on opposite sides of said rotatable member.

9. In a cigar making machine, a divided cigar mold of which the parts are movable toward and from each other; a tobacco magazine above said mold having a partition in its lower end forming two elongated passages communicating with said mold; a rotatable member in said mold normally disposed in position beneath said partition; means for discharging into said magazine a predetermined quantity of tobacco; means for forcing the tobacco through said passages into said mold on opposite sides of said rotatable member; and means for rotating said member after the tobacco has been delivered to said mold.

10. In a cigar making machine, a divided cigar mold of which the parts are movable toward and from each other; a tobacco magazine above said mold having a vertical partition in its lower end forming two elongated passages communicating with said mold; a flat rotatable member in said mold normally disposed in vertical position beneath said partition; means for discharging into said magazine a predetermined quantity of tobacco; means for forcing the tobacco through said passages into said mold on opposite sides of said rotatable member; means for rotating said member after the tobacco has been delivered to said mold; and means whereby a binder and wrapper may be admitted manually to the mold during the rotation of said member.

11. In a cigar making machine, a divided cigar mold of which the parts are movable toward and from each other; a tobacco magazine above said mold having a vertical partition in its lower end forming two elongated passages communicating with said mold; a flat rotatable member in said mold normally disposed in vertical position beneath said partition; means for discharging into said magazine a predetermined quantity of tobacco; means for forcing the tobacco through said passages into said mold in equal parts on opposite sides of said rotatable member; and means for closing the mold when the tobacco has been delivered thereto.

12. In a cigar making machine, a divided cigar mold of which the parts are movable toward and from each other; a magazine above said mold having a vertical partition in its lower end forming two elongated passages communicating with said mold; a flat rotatable member in said mold normally disposed in vertical position beneath said partition; means for discharging into said magazine a predetermined quantity of filler tobacco; means for forcing the tobacco through said passages into said mold in equal parts on opposite sides of said rotatable member; means for closing the mold when the filler tobacco has been delivered thereto; and means for rotating the member when the mold is closed.

13. In a cigar making machine, a longitudinally divided cigar mold of which the parts are movable toward and from each other; a tobacco magazine communicating with said mold having a partition in its end forming two elongated passages communicating with said mold; a rotatable member in said mold; means for discharging into said magazine a predetermined quantity of filler tobacco; means for forcing the tobacco through said passages into said mold in equal parts on opposite sides of said rotatable member; means for closing the mold when the filler tobacco has been delivered thereto; means for rotating the member when the mold is closed; and means whereby a binder and wrapper may be inserted manually into the mold during the rotation of said member.

14. In a cigar making machine, a divided cigar mold of which the parts are movable toward and from each other; a tobacco magazine above said mold having a vertical partition in its lower end forming two elongated passages communicating with said mold; a flat rotatable member in said mold normally disposed in vertical position beneath said partition; means for discharging into said magazine a predetermined quantity of tobacco; means for forcing the tobacco through said passages into said mold in equal quantity on opposite sides of said rotatable member; means for closing the mold when the tobacco has been delivered thereto; means for rotating the member when the mold is closed;

means whereby a binder and wrapper may be inserted manually into the mold during the rotation of said member; and means for withdrawing the rotatable member endwise from the completed cigar contained in said mold.

15. In a cigar making machine, a divided cigar mold of which the parts are movable toward and from each other; a tobacco magazine above said mold having a vertical partition in its lower end forming two elongated passages communicating with said mold; a flat rotatable member in said mold normally disposed in vertical position beneath said partition; means for discharging into said magazine a predetermined quantity of tobacco; means for forcing the tobacco through said passages into said mold in equal parts on opposite sides of said rotatable member; means for closing the mold when the tobacco has been delivered thereto; means for rotating the member when the mold is closed; means whereby a binder and wrapper may be inserted manually into the mold during the rotation of said member; means for withdrawing the rotatable member from the completed cigar within said mold; and means for subsequently opening the mold to permit the discharge of the completed cigar.

16. In a cigar making machine, a cigar mold, a magazine above said mold and communicating therewith; a delivery passage leading to said magazine; a tobacco conduit communicating with said delivery passage; means for forcing tobacco from said conduit across said passage; a knife reciprocable in said passage adapted to sever a predetermined quantity of tobacco from that remaining in said conduit; a reciprocable plunger for forcing the severed tobacco into said magazine; and a plunger in said magazine for subsequently forcing the severed tobacco into the mold.

17. In a cigar making machine, a cigar mold; a cigar shaped magazine above said mold and communicating therewith; a delivery passage leading to said magazine; a tobacco conduit communicating with said delivery passage; means for forcing tobacco from said conduit across said passage; a knife reciprocable in said passage adapted to sever a predetermined quantity of tobacco from that remaining in said conduit; a reciprocable plunger for forcing the severed tobacco into said magazine; and a plunger in said magazine for subsequently forcing the severed tobacco into the mold.

18. In a cigar making machine, a cigar mold, a magazine above said mold and communicating therewith by two passages; a flat sided rotatable member normally disposed vertically in the center of said mold; a delivery passage leading to said magazine; a tobacco conduit communicating with said delivery passsage; means for forcing tobacco from said conduit across said passage; a knife reciprocable in said passage adapted to sever a predetermined quantity of tobacco from that remaining in said conduit; a reciprocable plunger for forcing the severed tobacco into said magazine; and a plunger in said magazine for subsequently forcing the severed tobacco into the mold.

19. In a cigar making machine, a cigar mold, a magazine above said mold and communicating therewith; a delivery passage leading to said magazine; a tobacco conduit communicating the said delivery passage; a cam-controlled plunger for forcing tobacco from said conduit across said passage; a knife reciprocable in said passage adapted to sever a predetermined quantity of tobacco from that remaining in said conduit; a reciprocable plunger for forcing the severed tobacco into said magazine; and a plunger in said magazine for subsequently forcing the severed tobacco into the mold.

20. In a cigar making machine, a cigar mold, a magazine above said mold and communicating therewith; a delivery passage leading to said magazine; a tobacco conduit communicating with said delivery passage; means for forcing tobacco from said conduit across said passage; a knife reciprocable in said passage adapted to sever a predetermined quantity of tobacco from that remaining in said conduit; a reciprocable plunger for forcing the severed tobacco into said magazine; a plunger in said magazine for subsequently forcing the severed tobacco into the mold; a hopper communicating with said conduit and adapted to contain the tobacco supply; and means for feeding the tobacco from said hopper into said conduit.

21. In a cigar making machine, a divided cigar mold of which the parts are movable toward and from each other; a tobacco magazine above said mold; a knife in said magazine forming two passages communicating with said mold; and a plunger adapted to reciprocate and having two yielding members at its lower end adapted to force the tobacco through both passages into said mold.

22. In a cigar making machine, a divided cigar mold of which the parts are slidable toward and from each other; a tobacco magazine above said mold; a knife in said magazine forming two passages communicating with said mold; reciprocating means for forcing the tobacco through both passages into said mold; and means within said mold for rotating the tobacco contained therein.

23. In a cigar making machine, a divided cigar mold of which the parts are movable toward and from each other; a tobacco magazine above said mold; a knife in said magazine forming two passages communicating with said mold; means adapted to reciprocate and force the tobacco through both passages into said mold; means within said mold for rotating the tobacco contained therein;

and means for opening the mold prior to the delivery of tobacco thereto and additional means for subsequently closing the mold when the tobacco has been delivered.

24. In a cigar making machine, a divided cigar-shaped mold of which the parts are movable toward and from each other, one of said parts being slightly enlarged at the tapered end of the concavity therein; a magazine above said mold; a partition in the lower end of said magazine forming two passages therein; reciprocatory means adapted to force the tobacco in said magazine through said passages into said mold; and means within said mold for rotating the tobacco contained therein.

25. In a cigar making machine, a divided cigar mold of which the parts are movable toward and from each other; a tobacco magazine above said mold; a knife centrally disposed in the lower end of said magazine and forming two passages communicating with said mold; reciprocating means adapted to force the tobacco through both passages into said mold; a rotatable member within said mold; and means for withdrawing said rotatable member from the completed cigar.

26. In a cigar making machine, a longitudinally divided cigar mold of which the parts are movable towards and from each other; a tobacco magazine above and communicating with said mold when the latter is open; a rotatable member disposed within said mold; and means for rotating said rotatable member; and means for forcing tobacco from said magazine into said mold on opposite sides of said member.

27. In a cigar making machine, a divided cigar mold of which the parts are movable towards and from each other; a tobacco magazine above and communicating with said mold when the latter is open; a flat member centrally disposed within said mold and normally in a vertical plane; means for rotating said flat member; means for forcing tobacco from said magazine into said mold on opposite sides of said flat member; and means for subsequently withdrawing said member endwise from said mold.

28. In a cigar making machine, a divided cigar mold of which the parts are movable toward and from each other; a tobacco magazine above and communicating with said mold when the latter is open; a flat rotatable member in said mold centrally disposed in vertical position; means for discharging into said magazine a predetermined quantity of tobacco; and means for forcing the tobacco into said mold on opposite sides of said rotatable member.

29. In a cigar making machine, a divided cigar mold of which the parts are movable toward and from each other; a tobacco magazine above and communicating with said mold when the latter is open; a flat rotatable member normally disposed in vertical position in the center of said mold; means for discharging into said magazine a predetermined quantity of tobacco; means for forcing the tobacco in equal parts on opposite sides of said rotatable member; and means for rotating said member after the tobacco has been thus delivered.

30. In a cigar making machine, a divided cigar mold of which the parts are movable toward and from each other; a tobacco magazine above and communicating with said mold when the latter is open; a flat rotatable member normally disposed in vertical position in the center of said mold; means for discharging into said magazine a predetermined quantity of tobacco; means for forcing the tobacco into said mold on opposite sides of said rotatable member; means for rotating said member after the tobacco has been delivered to said mold and the mold has been closed; and means whereby a binder and wrapper may be admitted manually to the mold during the rotation of said member.

31. In a cigar making machine, a divided cigar mold of which the parts are movable toward and from each other; a tobacco magazine above and communicating with said mold when the latter is open; a flat rotatable member normally disposed in vertical position in the center of said mold; means for discharging into said magazine a predetermined quantity of tobacco; means for forcing the tobacco into said mold on opposite sides of said rotatable member; and means for closing the mold when the tobacco has been delivered thereto.

32. In a cigar making machine, a divided cigar mold of which the parts are movable toward and from each other; a tobacco magazine above and communicating with said mold when the latter is open; a flat rotatable member normally disposed in vertical position in the center of said mold; means for discharging into said magazine a predetermined quantity of tobacco; means for forcing the tobacco into said mold on opposite sides of said rotatable member; means for closing the mold when the tobacco has been delivered thereto; and means for rotating said member while the mold is closed.

33. In a cigar making machine, a divided cigar mold of which the parts are movable toward and from each other; a tobacco magazine above and communicating with said mold when the latter is open; a flat rotatable member normally disposed in vertical position in the center of said mold; means for discharging into said magazine a predetermined quantity of tobacco; means for forcing the tobacco into said mold on opposite sides of said rotatable member; means for closing the mold when the tobacco has been delivered thereto; means for rotating the member while the mold is closed; and means whereby a binder and wrapper may be inserted manually into the closed mold during the rotation of said member.

34. In a cigar making machine, a divided cigar mold of which the parts are movable toward and from each other; a tobacco magazine above and communicating with said mold when the latter is open; a flat rotatable member normally disposed in vertical position in the center of said mold; means for discharging into said magazine a predetermined quantity of tobacco; means for forcing the tobacco into said mold in equal parts on opposite sides of said rotatable member; means for closing the mold when the tobacco has been delivered thereto; means for rotating the member while the mold is closed; means whereby a binder and wrapper may be inserted manually into the mold during the rotation of said member; and means for withdrawing the rotatable member endwise from the completed cigar while in said mold.

35. In a cigar making machine, a divided cigar mold of which the parts are movable toward and from each other; a tobacco magazine above and communicating with said mold when the latter is open; a flat rotatable member normally disposed in vertical position in the center of said mold; means for discharging into said magazine a predetermined quantity of tobacco; means for forcing the tobacco into said mold on opposite sides of said rotatable member; means for closing the mold when the tobacco has been delivered thereto; means for rotating the member while the mold is closed; means whereby a binder and wrapper may be inserted manually into the mold during the rotation of said member; means for withdrawing the rotatable member endwise from the completed cigar while in the mold; and means for subsequently opening the mold to permit the discharge of the completed cigar.

36. In a cigar making machine, a cigar mold, a magazine cigar-shaped in cross section above said mold and communicating therewith; a delivery passage leading to said magazine and also cigar-shaped in cross section; a tobacco conduit communicating with said delivery passage cigar-shaped in cross section; means for forcing tobacco from said conduit across said passage; a knife reciprocable in said passage adapted to sever a predetermined quantity of tobacco from that remaining in said conduit; a reciprocable plunger for forcing the severed tobacco into said magazine; and another plunger in said magazine for subsequently forcing the severed tobacco into the mold.

37. In a cigar making machine, a cigar mold; a tobacco magazine cigar-shaped in cross section with its lower end communicating with said mold when open; a delivery passage leading to said magazine; a tobacco conduit communicating with said delivery passage; means for forcing tobacco from said conduit across said passage; a knife reciprocable in said passage adapted to sever a predetermined quantity of tobacco from that remaining in said conduit; a reciprocable plunger for forcing the severed tobacco into said magazine; another plunger in said magazine for subsequently forcing the severed tobacco into the mold; and adjustable means for regulating the amount of tobacco discharged from said conduit into said passage.

38. In a cigar making machine, a cigar mold, a magazine above said mold and communicating therewith; a rotatable member disposed in the center of said mold; a delivery passage leading to said magazine and cigar shaped in cross section; a tobacco conduit communicating with said delivery passage; means for forcing tobacco from said conduit across said passage; a knife reciprocable in said passage adapted to sever a predetermined quantity of tobacco from that remaining in said conduit; a reciprocable plunger for forcing the severed tobacco into said magazine; and a plunger in said magazine for subsequently forcing the severed tobacco in two equal parts into the mold on opposite sides of said rotatable member.

39. In a cigar making machine, a cigar mold, a magazine communicating therewith; a delivery passage leading to said magazine; a tobacco conduit communicating with said delivery passage; a cam-controlled plunger for forcing tobacco from said conduit across said passage; a knife reciprocable in said passage adapted to sever a predetermined quantity of tobacco from that remaining in said conduit; an adjustable member opposite the discharge end of said conduit for regulating the quantity of tobacco to be severed by said knife; a reciprocable plunger for forcing the severed tobacco into said magazine; and a plunger in said magazine for subsequently forcing the severed tobacco into the mold.

40. In a cigar making machine, a cigar mold, a magazine above said mold and communicating therewith; a delivery passage leading to said magazine; a tobacco conduit communicating with said delivery passage and cigar-shaped in cross section; means for forcing tobacco from said conduit across said passage; a knife reciprocable in said passage adapted to sever a predetermined quantity of tobacco from that remaining in said conduit; a reciprocable plunger for forcing the severed tobacco into said magazine; another plunger in said magazine for subsequently forcing the severed tobacco into the mold; a hopper communicating with said conduit and adapted to contain the tobacco supply; and endless belts for feeding the tobacco from said hopper into said conduit.

41. In a cigar making machine, a divided mold, the two parts of which are slidable toward and from each other, said parts having concavities therein together conforming to the shape of a cigar; and means for separating said parts to admit a filler and subsequently move said parts into closed position to permit the insertion manually of a binder and wrapper successively.

42. In a cigar making machine, a longitudinally divided mold, the two parts of which are slidable towards and from each other, said parts having concavities therein together conforming to the shape of a cigar; a rotatable member centrally disposed in the mold when open to receive a supply of filler tobacco; and means for rotating said member when the mold is closed.

43. In a cigar making machine, a divided mold, the two parts of which are slidable towards and from each other, said parts having concavities therein together conforming to the shape of a cigar; a rotatable member centrally disposed in the mold when open to receive a supply of filler tobacco; means for rotating said member while the mold is closed; and means whereby a binder and a wrapper may be inserted manually while said member is rotating.

44. In a cigar making machine, a divided mold, the two parts of which are slidable towards and from each other, said parts having concavities therein together conforming to the shape of a cigar; a rotatable member centrally disposed in the mold when open to receive a supply of filler tobacco; means for rotating said member when the mold is closed; means whereby a binder and a wrapper may be inserted manually while said member is rotating; and means for subsequently removing said rotatable member from the completed cigar within the mold.

45. In a cigar making machine, a cigar mold; means for inserting tobacco therein; and a rotatable flat sided member within said mold and adapted to rotate the tobacco contained therein.

46. In a cigar making machine, a cigar mold; means for inserting tobacco therein; and a rotatable flat sided member within said mold and adapted to rotate the tobacco contained therein, said member having its opposite edges curved in opposite directions.

47. In a cigar making machine, a divided cigar mold, the two parts of which are slidable towards and from each other; means for moving said mold to the bunch-receiving and wrapper-receiving position in succession; means for opening the mold when in bunch-receiving position; means for discharging a bunch of tobacco into said mold while open; means for closing said mold while in wrapper-receiving position; means for rotating the tobacco in the mold when the latter is closed; and means whereby a wrapper may be inserted manually in the mold during the rotation of the tobacco.

48. In a cigar making machine, a cigar mold; a rotatable flat sided member therein; and means for inserting equal quantities of filler tobacco into said mold on opposite sides of said member.

49. In a cigar making machine, a cigar mold; a rotatable flat sided member therein and extending from end to end thereof; and means for inserting filler tobacco into said mold on opposite sides of said member.

50. In a cigar making machine, a cigar mold; a rotatable flat sided member within said mold and extending from end to end thereof; means for inserting filler tobacco into said mold on opposite sides of said member; and means for subsequently removing said member from said mold.

51. In a cigar making machine, a cigar mold open in bunch receiving position; a tobacco magazine above said mold and communicating therewith, said magazine including a part seatable against and registering with the open mold; and means for moving said part away from the mold when it is advanced into wrapper receiving position.

52. In a cigar making machine, a cigar mold open in bunch receiving position; a tobacco magazine above said mold and communicating therewith, said magazine being in two parts; springs for forcing the lower part downwardly and cam members for moving said lower part upwardly when the mold advances into its wrapper receiving position.

53. In a cigar making machine, a cigar mold open in filler receiving position; a magazine in two parts one of which is yieldingly seated against said mold in registration therewith and is movable; and means for moving said movable part away from the mold when it advances into wrapper receiving position.

54. A cigar mold, a turner disposed within said mold; means to place a predetermined quantity of filler within the mold on each side of the turner; and means to rotate the turner.

55. A cigar mold of two complementary members each having a concavity adapted to form substantially a longitudinal half of a cigar; a turner disposed between said members; means to place a predetermined quantity of filler tobacco on each side of said turner; means whereby a binder and wrapper may be inserted manually into the mold and disposed around the filler when the latter is rotated; and means to rotate the turner.

56. A cigar mold of two complementary members each having a concavity adapted to form substantially a longitudinal half of a cigar; a turner disposed between said members; means to place a predetermined quantity of filler tobacco on each side of said turner; means to rotate the turner; means whereby a binder and wrapper may be inserted manually into the mold and disposed around the filler when the latter is rotated; means to rotate said turner; and means for withdrawing the turner.

57. A cigar mold of two complementary members adapted to slide towards and away from each other, each having a concavity adapted to form substantially a longitudinal half of a cigar; a turner disposed between said members; means to place a predetermined quantity of filler tobacco on each side of said turner; means to rotate the turner; means whereby a binder and wrapper may be inserted manually into the mold and disposed around the filler when the latter is rotated; and means to withdraw the turner.

58. A cigar mold of two complementary members adapted to slide towards and away from each other, each having a concavity adapted to form substantially a longitudinal half of a cigar leaving when closed a longitudinal slot communicating with the interior of the mold; a turner disposed between said members; means to place a predetermined quantity of filler tobacco on each side of said turner; means to rotate the turner; means whereby a binder and wrapper may be inserted manually into said slot and disposed around the filler when the latter is rotated; and means to withdraw the turner.

59. An apparatus for making a cigar comprising a cigar mold, a tobacco rotating member rotatable therein, and means for supplying filler tobacco into said mold in two charges on opposite sides of said member.

60. An apparatus for making a cigar comprising a cigar mold adapted to be opened and closed, a tobacco rotating member rotatable within said mold, and means for supplying filler tobacco into said mold, when opened, in two charges on opposite sides of said member.

61. An apparatus for making cigars comprising a cigar mold, a tobacco rotating member rotatable therein, and means for supplying filler tobacco into the mold while said member is in position therein.

62. An apparatus for making cigars comprising a cigar mold adapted to be opened and closed, a tobacco rotating member rotatable in said mold, and means for supplying filler tobacco into said mold, when opened, while said member is in position therein.

Signed by me at 746 Old South Bldg., Boston, Mass., this 8th day of September, 1925.

WILLIAM T. FITZ GERALD.